March 11, 1969

W. H. GLAZIER 3,431,999

COMMON DEPTH POINT SEISMIC PROSPECTING

Filed April 26, 1967

Walter H. Glazier INVENTOR.

BY John B. Davidson

ATTORNEY

United States Patent Office 3,431,999
Patented Mar. 11, 1969

---

3,431,999
COMMON DEPTH POINT SEISMIC PROSPECTING
Walter H. Glazier, Calgary, Alberta, Canada, assignor to Esso Production Research Company, a corporation of Delaware
Filed Apr. 26, 1967, Ser. No. 634,002
U.S. Cl. 181—.5
Int. Cl. G01v 1/00
4 Claims

---

ABSTRACT OF THE DISCLOSURE

Common depth point seismic method in which seismic disturbances are initiated at a first line of locations substantially perpendicular to a plurality of parallel linear detector arrays, the arrays are moved half the distance between impulse locations, and seismic impulses are initiated midway between the first impulse locations.

---

BACKGROUND OF THE INVENTION

The present invention has to do with the so-called common depth point technique for seismic prospecting, and more particularly to a technique for common depth point seismic prospecting where it is desired to carefully define the lithologic structure of a zone of the earth's subsurface.

The horizontal stacking or common depth point technique of seismic prospecting is well known. In accordance with this technique, seismic disturbance locations and seismic wave detection locations are positioned on the earth's surface in a manner such that seismic waves reflected from a common reflection point on a reflecting interface in the earth's subsurface follow a number of different ray paths, the seismic waves are detected and recorded, and the recorded traces are combined after appropriate corrections have been applied thereto so that reflections from common depth points are added. Heretofore, data traces to be combined in accordance with the common depth point technique have been obtained from seismic detectors positioned along a common traverse with the locations of the seismic disturbances. In many areas it is difficult, if not impossible, to define the earth's subsurface using the common depth point technique. For example, the terrain in a given area may be so rough or inaccessible that geophones and disturbance locations cannot be located therein. Also, when it is desired to carefully delineate the entire subsurface beneath a small area, prior art techniques may be exorbitantly expensive. In addition, it may be desirable to carefully delineate a zone of the earth's subsurface in accordance with the so-called three-dimensional seismic technique, as described in Netherlands patent application 6600629, published July 19, 1966. Heretofore, no convenient technique has been known for obtaining common depth point information for use with the three-dimensional seismic technique.

SUMMARY OF THE INVENTION

In accordance with the present invention, a plurality of evenly spaced-apart first seismic wave transmitting locations are located along a traverse, and a plurality of evenly spaced-apart second transmitting locations are located between the first locations, the individual locations in said first and second plurality of locations being alternately positioned and evenly spaced apart. A plurality of first detecting locations are located along a plurality of evenly spaced-apart lines that are substantially perpendicular to the first traverse. A second plurality of detecting locations are located along a second plurality of evenly spaced-apart lines that are parallel to the first lines, the individual lines in said first and second plurality of lines being alternately positioned and evenly spaced apart. A sequence of seismic disturbances is individually produced at the first transmitting locations, and seismic waves produced thereby are detected at the first detecting locations to produce a plurality of seismic records. A second plurality of seismic disturbances are individually produced at the second transmitting locations and the seismic waves resulting therefrom are detected at the second detecting locations to produce a second plurality of seismic records. The seismic records thus made are selectively combined to produce composite records wherein reflections from common depth points are added.

The detection locations may be successively located in groups of pluralities of evenly spaced-apart lines, which groups are located at spaced intervals. In this manner, substantially continuous common depth point coverage is provided for contiguous zones of the earth's subsurface.

Objects and features of the invention not apparent from the above discussion will become evident upon consideration of the following detailed description thereof.

DESCRIPTION OF THE PREFERRED EMBODIMENT

Figure 1:
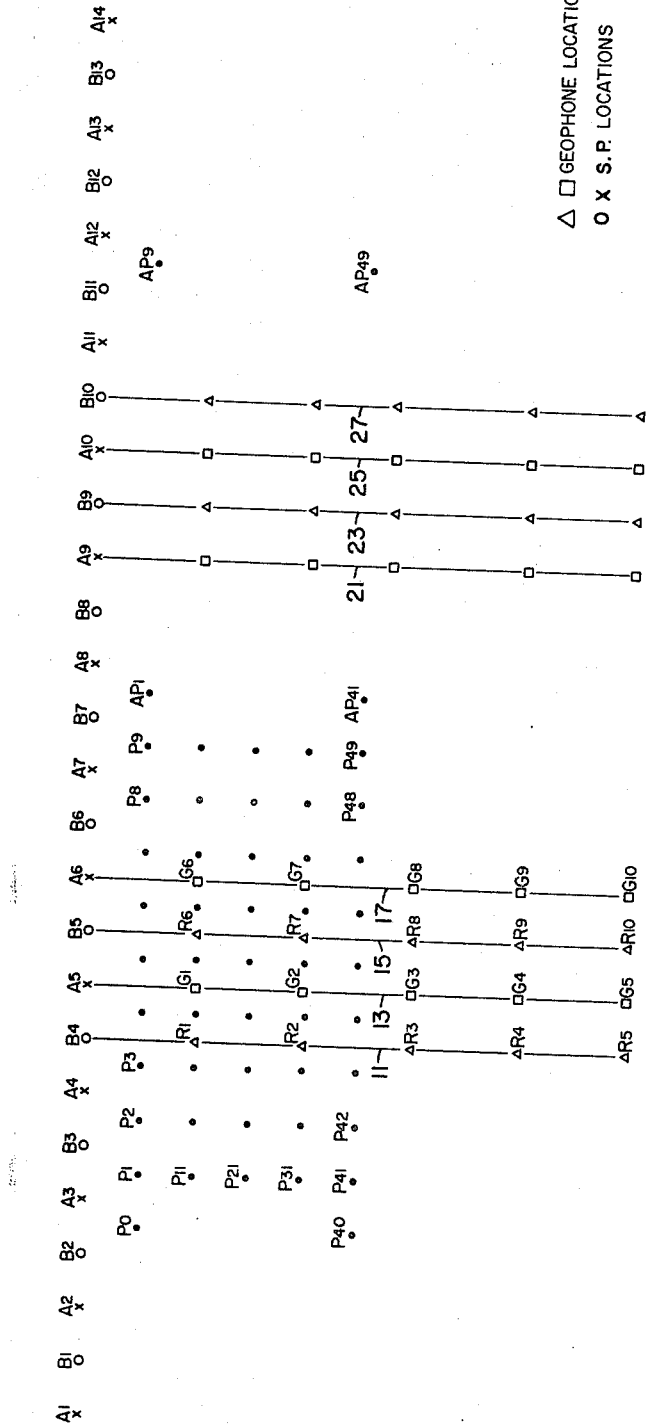
FIG. 1 is a plan view of seismic disturbance locations and seismic wave pickup locations in accordance with the invention.

In FIG. 1 the locations of seismic disturbances are illustrated by an X or by an O, whereas the locations of a particular geophone station is illustrated either by a triangle or a square. Seismic disturbance locations are illustrated as being located along a seismic traverse extending in the figure from the disturbance location designated A1 to the disturbance location designated A14. The seismic disturbance locations A1, A2, A3 . . . A13, A14 are evenly spaced apart along the traverse (i.e., the distance between the pairs of locations is substantially the same). Similarly, the disturbance locations B1, B2 . . . B12, B13 are evenly spaced and are positioned between pairs of disturbance locations in the A series aforementioned. In other words, B1 is between locations A1 and A2, B2 is between locations A2 and A3, etc.

A plurality of evenly spaced lines for seismic detector or geophone locations are laid out so that they are substantially parallel and so that they intersect the seismic traverse at substantially right angles thereto. While the traverse and the lines on which the geophones are to be positioned may not be exactly perpendicular, they should be within about 10 or 15° of being at right angles. Geophone stations are located along the lines at evenly spaced intervals from the seismic traverse. Preferably, the spacing between the lines 11, 13, 15, and 17 is the same as the spacing between adjacent seismic disturbance locations along the seismic traverse. The geophone locations on line 11 are designated R1 to R5, those along line 13 are designated G1 to G5, those along line 15 are designated R6 to R10, and the geophone locations along line 17 are designated G6 to G10.

Figure 3:
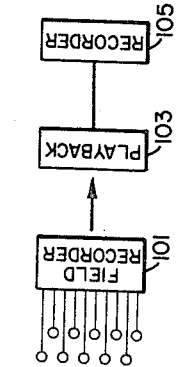
FIG. 3 is a simplified schematic diagram of detecting and processing equipment for use with the invention.

Initially, geophones are positioned along lines 11 and 15 at locations R1 to R10, and are connected to conventional recording equipment 101, as illustrated in FIG. 3. Seismic disturbances are produced in sequence at locations A1, A2, A3 . . . A8, A9, and individual seismograms are recorded indicative of seismic waves detected by the detectors at locations R1 to R10 as the result of each seismic disturbance. The geophones are then moved to locations G1 to G10 on lines 13 and 17. Seismic disturbances are then initiated at locations B1, B2 . . . B8, B9, and the seismic waves produced thereby are recorded to produce a plurality of seismograms, one seismogram for each of the seismic disturbances.

The seismic records made as described above are now selectively combined to produce composite records wherein reflections from common depth points are added. For example, it can be seen upon an examination of FIG. 1 that the reflection points on horizontal reflection horizons in the earth's subsurface for seismic waves produced by a disturbance location A1 and detected at locations R6, R7, R8, R9, and R10 will be respectively at locations below surface points P1, P11, P21, P31, and P41. A disturbance at location A2 detected by geophones at locations R1 through R5 will have the same respective depth points or reflection points. Furthermore, reflected seismic waves detected at geophone locations G1 to G5 on line 13 resulting from a disturbance at location B1 will likewise be reflected from reflection points below points P1 through P41. When the seismic records are corrected in the usual manner to remove the effects of variations in elevation, weathering layer thickness, and movement, the records may be thus selectively combined so that reflections from common depth points are added, using techniques well known to the art. The result for reflection points below surface P1, P11, P21, P31, and P41 will be what is known as a threefold common depth point trace. It should be noted that seismic waves detected at locations R1, R2, R3, R4, and R5 as a result of a seismic disturbance at location A1 will have reflection points below the line from P0 to P40. No other combination of seismic disturbance location and seismic wave detection location will have such depth points. So, for the purposes of the present invention, such traces may be discarded.

The lines of reflection points below surface points P2 to P41 will produce reflections on four traces produced in accordance with the technique described above. For example, data traces produced by geophones at locations R1, G1, R6, and G6 responsive to disturbances at locations A3, B2, A2, and B1, respectively, will contain events from depth points below location P2. Fourfold coverage will thus be had for the zone beneath the area denoted by the locations P2, P42, P48, P8. Again, threefold coverage will be had along the line P9–P49.

The coverage may be extended by moving the geophones to locations on lines 21 and 25, producing seismic disturbances in sequence at locations B5, B6, B7 . . . B12, B13, then moving the geophones to locations on lines 23 and 27 and producing seismic disturbances at locations A6, A7, A8 . . . A13, A14. This will produce common depth point coverage in the zone of the earth's subsurface beneath the rectangle AP1, AP41, AP49, AP9.

In the drawing the spacing between adjacent geophones on the various lines of geophones is made equal to the spacing between disturbance locations in the series of seismic disturbances detected by a particular line of geophones. Manifestly, this exact procedure need not be followed in practice, the spacing between adjacent geophones depending primarily on the density of common depth point coverage desired in the zone of the earth's subsurface to be defined. Furthermore, the lines of geophones may not be exactly as illustrated. For example, lines 11 and 15 in some circumstances could advantageously intersect the seismic traverse at the seismic disturbance locations A5 and A6, respectively, and lines 13 and 17 could intersect the traverse at locations B5 and B6, respectively. Alternatively, the lines of geophone locations could intersect the traverse between adjacent seismic disturbance locations. It is essential, however, that the lines of detector locations be substantially equal to the distance between adjacent seismic disturbance locations along the traverse.

As illustrated in FIG. 3, the output signals from a pattern of geophones are initially recorded by a field recorder 101. This field recorder may record the signals as traces in analog form or in digital form. When the recorder is recording in digital form, any suitable format may be used, such as the trace sequential format that is described in Geophysics, August 1966, p. 812. The seismic records are then transported to a playback and processing unit 103, which may be either of the analog or digital computer type, as appropriate, and the output signals therefrom recorded on a playback recorder 105. Equipment corresponding to units 101, 103, and 105 is well known to the art and will not be further discussed herein.

Figure 2:
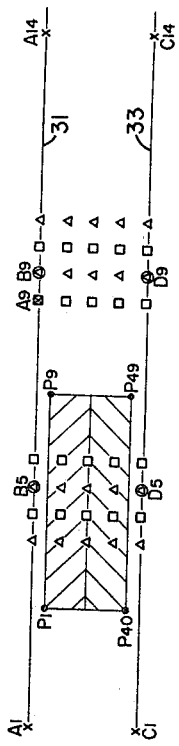
FIG. 2 is a simplified plan view of the earth's surface illustrating seismic disturbance locations and seismic wave pickup locations in accordance with a modification of the invention.

With reference now to FIG. 2, there is illustrated modification of the invention that differs from the embodiment of FIG. 1 primarily in that seismic disturbances are located on two parallel lines 31 and 33 rather than on one line, as illustrated in FIG. 1. This results in a larger zone of common depth point coverage for a given field effort in moving geophone cables. Only a few seismic disturbance locations are designated in FIG. 2 to avoid unnecessarily cluttering the drawing with reference numerals. The disturbance locations on line 31 are numbered in the A and B series, as in FIG. 1, and those on line 33 are given reference designations in the C and D series, the numeral designations corresponding to the numeral designations of disturbance locations on line 31.

I claim:
1. The method of seismic prospecting comprising:
   locating a plurality of evenly spaced-apart first transmitting along a first traverse;
   locating a plurality of evenly spaced-apart second transmitting locations along said traverse, between said second locations;
   locating a plurality of first detecting locations along a first plurality of evenly spaced-apart lines that are substantially perpendicular to said first traverse;
   locating a plurality of second detecting locations along a second plurality of evenly spaced-apart lines that are parallel to said first lines;
   said first and second lines being alternately positioned and evenly spaced apart a given distance;
   said first and second locations being alternately positioned and evenly spaced apart by said given distance;
   individually producing a sequence of seismic disturbances at said first transmitting locations and at said first detecting locations detecting seismic waves produced by each seismic disturbance to produce a plurality of seismic records;
   individually producing a sequence of seismic disturbances at said second transmitting locations, and at said second detecting locations detecting seismic waves produced by each of said second seismic disturbances to produce a second plurality of seismic records; and selective combining the records thus made to produce composite records wherein reflections from common depth points are added.

2. The method of claim 1 wherein said plurality of first transmitting locations and said plurality of second transmitting locations are also positioned on a second traverse parallel to said first traverse, and the detecting locations are positioned between said first traverse and said second traverse.

3. The method of claim 1 wherein groups of said pluralities of evenly spaced-apart lines are located at spaced intervals, and detecting locations are successively located on said groups of lines to provide substantially a continuous common depth point coverage of contiguous zones of the earth's subsurface.

4. The method of claim 1 wherein each line is positioned so that a transmitting location lies thereon.

References Cited

UNITED STATES PATENTS 2,305,383  12/1942  Hoover et al. _____ 181—.5

SAMUEL FEINBERG, *Primary Examiner.*